Dec. 11, 1934. W. A. LOTH Re. 19,395

MEANS FOR ANNULLING THE EFFECT OF STRAY FIELDS ON RADIO RECEIVING SYSTEMS

Original Filed Oct. 3, 1923

INVENTOR
William Arthur Loth
BY Hoguet & Neary
ATTORNEYS

Reissued Dec. 11, 1934

Re. 19,395

UNITED STATES PATENT OFFICE 19,395

MEANS FOR ANNULLING THE EFFECT OF STRAY FIELDS ON RADIO RECEIVING SYSTEMS

William Arthur Loth, Paris, France, assignor to Societe Industrielle des Procedes W. A. Loth, Paris, France Original No. 1,753,610, dated April 8, 1930, Serial No. 666,395, October 3, 1923. Application for reissue April 7, 1932, Serial No. 603,889. In France September 7, 1923

12 Claims. (Cl. 250—20)

This invention pertains generally to means for neutralizing the effect of one circuit upon a second circuit due to the field or fields set up by said first circuit, and pertains more particularly to the elimination of parasitic currents which would ordinarily be set up in radio and other circuits by ignition apparatus for internal combustion engines.

The parasitic currents which are ordinarily set up in adjacent circuits by ignition apparatus for internal combustion engines are of low, medium and high frequency, that is, of both audio and radio frequency, and are produced by induction and/or radiation. The effects of induction are produced by both the primary and secondary circuits of the ignition apparatus. Radiation, on the other hand, is more prevalent in the secondary circuit.

To eliminate the above-mentioned parasitic currents, I produce in the circuit affected by the ignition apparatus electric currents which are opposite and substantially equal to such parasitic currents, and set up fields which are opposite to those ordinarily set up by the ignition apparatus so as to overcome the tendency to produce parasitic currents.

Means for accomplishing these ends are illustrated in the accompanying drawing in which like reference characters are appended to like parts, and in which Fig. 1 is a diagrammatic view illustrating the invention;

Figure 1:
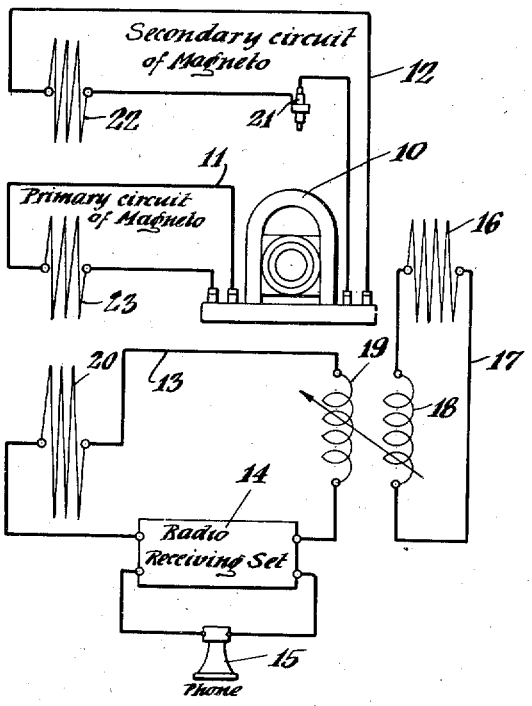

Referring to Fig. 1, at 10 is shown a magneto having an external primary circuit 11 and an external secondary circuit 12. At 13 is shown an adjacent circuit which is located anywhere within the field or fields set up by the ignition apparatus. For the purpose of illustration, a receiving antenna 20 shown as a loop and a radio receiving set 14 are connected in the circuit 13, the radio receiving set 14 having an earphone 15 connected thereto. Any other circuit may be substituted therefor.

For setting up in the circuit 13 currents which are of like frequency but substantially 180° out of phase with the parasitic currents caused by the magneto, a coil or its equivalent shown at 16 is placed adjacent to the magneto 10. In the circuit 17 of coil 16 is connected a primary winding 18 which is adjustably coupled with a secondary winding 19 connected in circuit 13. The frequency or frequencies of currents set up in coil 16 by the ignition apparatus will be the same as those of currents set up in the circuit 13 by the ignition apparatus. The desired phase difference in winding 18 may be obtained by choice of connections. By adjustment of the coupling between the windings 18 and 19, the amplitudes of the currents which oppose the parasitic currents in circuit 13 may be adjusted. By this means the parasitic currents, particularly those caused by the magneto 10, may be neutralized.

To neutralize the parasitic effects of the external circuits of the ignition system, I prefer to also use compensating emitters which are placed in or coupled to the external circuits of the ignition system and which are positioned so as to have a neutralizing action upon the fields, preferably both induction and radiation, produced by the external circuits.

For instance, a compensating emitter such as a loop or coil may be connected to the secondary circuit or to the primary circuit or to each.

The energy radiated by the secondary circuit, particularly if the spark plug or plugs illustrated at 21 are located at a distance from the generator, is often quite appreciable.

To neutralize the field or fields ordinarily set up by the external portion of the secondary circuit 12 an emitter 22 may be connected to the external secondary circuit 12. The emitter 22 should be so arranged as to set up a field which is opposite to that set up by the external secondary circuit 12 itself. The emitter 22 may be so selected that it will substantially neutralize the effects of the external secondary circuit 12 upon the circuit 13. To assist in this neutralization the receiving set 14 may be enclosed in a Faraday cage.

Generally speaking, the emitter 22 will produce better results if placed in the general neighborhood of the ignition apparatus.

In addition to the parasitic currents ordinarily set up in circuit 13 by the external secondary circuit 12, parasitic currents are set up by the current in the external primary circuit 11 and by variations of the magnetic flux in the magneto due, for instance, to variations of the air gap.

To neutralize the effects of the primary circuit 11 on the circuit 13, I may connect an emitter 23 to such circuit, said emitter 23 being so selected as to substantially neutralize the effects of the primary circuit 11 on the circuit 13.

To attenuate the effect of the variations in magnetic flux in the magneto 10 upon the circuit 13, I divide the magnetic field, for instance, longitudinally of the magneto and reverse one-half with respect to the other so that one-half the flux flows through the armature in one direction and the other half in the opposite direction.

Figure 2:
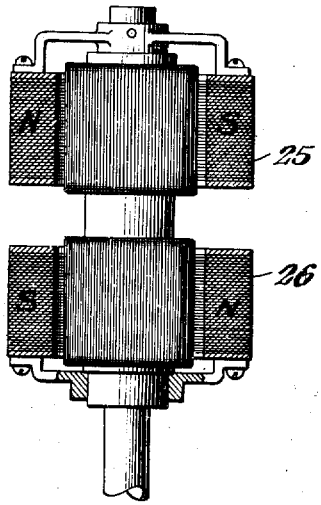
Fig. 2 is a section of a magneto.

When the magnetic field of the generator is produced by permanent magnets, two magnets of substantially equal strength may be provided and one reversed with respect to the other as shown in section at 25 and 26 in Fig. 2.

The winding (primary) or windings (primary and secondary) are preferably wound on the armature in sections and each section is arranged between one set of poles. The sections of each winding are preferably connected so that the currents induced will add either by a series or a parallel arrangement. One or more breakers may be employed. Each section may, of course, be connected in an independent circuit if desired without departing from the invention.

Figure 3:
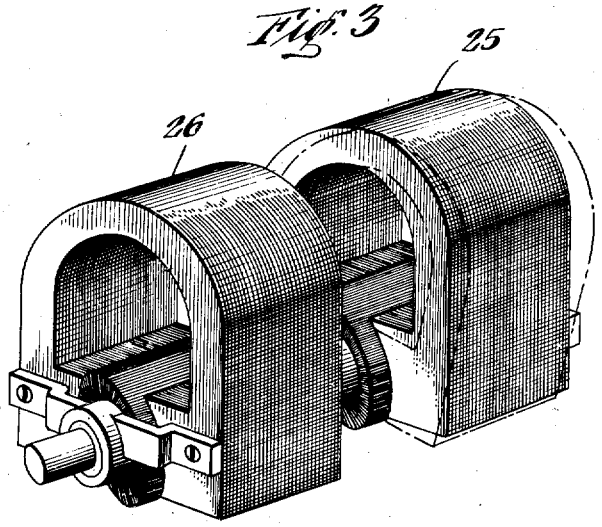
Fig. 3 is a perspective view of a magneto.

The fields set up by the two permanent magnets should be as nearly equal as possible and should be substantially opposite in direction. In order to adjust the direction of one field with respect to the other, one magnet may be made adjustable circumferentially as suggested in dotted lines in Fig. 3.

In order to neutralize the effect of each winding on the receiving circuit 13, the two sections of each winding may be so arranged on the armature that the effect of the current in one section upon the circuit 13 will be neutralized by the current in the other section. In other words, each winding is so arranged on the armature that the parasitic currents produced in circuit 13 by the field set up by the current in one section are equal and opposed to the parasitic currents produced in circuit 13 by the field set up by the current in the other section. One means of accomplishing this end is by winding the sections oppositely. The manner of winding will be understood by persons skilled in the art upon becoming familiar with this invention. The neutralization of the effect of the windings on the circuit 13 may or may not be in conjunction with the reversal of the field poles as desired. It is understood, of course, that the manner of winding will depend upon the position of the poles.

While the invention has been described in connection with a magneto having two sets of poles, it is understood that any generator of any type with any number of sets of poles, and a corresponding number of winding sections, may be substituted therefor without departing from the spirit of the invention. The same applies to the emitters 22 and 23, coil 16, as well as other parts of the circuit, all of which have been particularly described merely for the purpose of illustration.

The invention is applicable for eliminating parasitic currents in any character of circuits, such as receiving circuits for radio telegraphy and telephony, radiogoniometry, guide cable purposes, etc.

Having described my invention, it is obvious that many modifications may be made in the same within the scope of the claims without departing from the spirit thereof.

This application is for the reissue of U. S. Letters Patent No. 1,753,610 granted April 8, 1930.

The term "receiving circuit" as used in the claims is intended to include any circuit within the field of influence of said ignition circuit.

I claim:

1. In a magnetic field or electro-magnetic wave receiving system including a loop antenna, an internal combustion engine having a magneto with primary and secondary winding, an emitting winding arranged in series with the primary winding of the magneto to induce in the antenna currents which are equal and in opposition to those induced by the primary current of the magneto.

2. In a magnetic field or electro-magnetic wave receiving system including a loop antenna, an internal combustion engine having an ignition system including a magneto with primary and secondary circuits creating a magnetic field, and a spark plug, inserted in the secondary circuit of the said magneto, a receiving winding arranged in the magnetic field of the magneto, means for obtaining an inductive coupling between the said winding and the said antenna in such a manner that the currents induced in the winding are in opposition to those induced in the loop antenna, means for modifying the inductive coupling between the winding and the loop antenna, an emitting winding arranged in series in the primary circuit of the magneto, a second emitting winding in series in the secondary circuit of the magneto and with the spark plug.

3. In a magnetic field or electro-magnetic wave receiving system including a loop antenna, an internal combustion engine having an ignition system including a magneto with primary and secondary circuits creating a magnetic field, and a spark plug, inserted in the secondary circuit of the said magneto, a receiving winding arranged in the magnetic field of the magneto, means for obtaining an inductive coupling between the said winding and the said antenna in such a manner that the currents induced in the winding are in opposition to those induced in the loop antenna, means for modifying the inductive coupling between the winding and the loop antenna, an emitting winding arranged in series in the primary circuit of the magneto, a second emitting winding in series in the secondary circuit of the magneto and with the spark plug, a double pair of inductors for the magneto, the adjacent poles being of opposite polarity, and a corresponding number of armature pairs.

4. In a magnetic field or electro-magnetic wave receiving system including a loop antenna, an internal combustion engine having an ignition system including a magneto with primary and secondary circuits creating a magnetic field, and a spark plug, inserted in the secondary circuit of the said magneto, a receiving winding arranged in the magnetic field of the magneto, means for obtaining an inductive coupling between the said winding and the said antenna in such a manner that the currents induced in the winding are in opposition to those induced in the loop antenna, means for modifying the inductive coupling between the winding and the loop antenna, an emitting winding arranged in series in the primary circuit of the magneto, a second emitting winding in series in the secondary circuit of the magneto and with the spark plug, a double pair of inductors for the magneto, the adjacent poles being of opposite polarity, a corresponding number of armature pairs, the successive armatures being composed of oppositely wound coils.

5. In a magnetic field or electro-magnetic wave receiving system including a loop antenna, an internal combustion engine having a magneto with primary and secondary winding, an emitting winding arranged in series with the secondary winding of the magneto to induce in the antenna currents which are equal and in opposition to those induced by the secondary circuit current of the magneto.

6. In a magnetic field or electro-magnetic wave receiving system including a loop antenna, an internal combustion engine having a magneto with primary and secondary winding, an emitting winding arranged in series with one of said above-mentioned windings of the magneto to induce in the antenna currents which are equal and in opposition to those induced by the current in said last mentioned winding of the magneto.

7. In an electro-magnetic wave receiving system including an antenna, an internal combustion engine having an ignition system with primary and secondary windings, an emitting winding coupled with one of said above mentioned primary and secondary windings of said ignition system to set up in the antenna currents which substantially neutralize those currents set up in said antenna by the current flow in said last mentioned winding of said ignition system.

8. In combination, an ignition circuit, a receiving circuit within the field of influence of said ignition circuit, said ignition circuit including a generator, said generator having at least two pairs of field poles and a rotating armature arranged between said field poles so as to create a variable air gap between said armature and said field poles, said pairs of poles being reversed with respect to each other so that substantially one-half of the magnetic flux flows through said armature between each pair of field poles in a direction opposite to that of the magnetic flux flowing through said armature between the other pair of field poles in order substantially to neutralize the influence on said receiving circuit of the variations in magnetic flux caused by said variable air gap, a circuit external to said generator and connected thereto, and an emitter connected to said external circuit, said emitter positioned with respect to said external circuit so as to oppose the influence of said external circuit upon said receiving circuit.

9. In combination, an ignition circuit, a receiving circuit within the field of influence of said ignition circuit, said ignition circuit having a generator, said generator having an armature winding and a magnetic field, said field divided into substantially equal parts, said parts arranged so that substantially one-half of the magnetic flux flows through the armature in a direction opposite to that of the other half of the magnetic flux, said armature wound in sections in such manner as to permit induced current to flow through said sections, a circuit external to said generator and connected thereto, and an emitter connected to said external circuit, said emitter positioned with respect to said external circuit so as to oppose the influence of said external circuit upon said receiving circuit.

10. In combination, an ignition circuit, a receiving circuit within the field of influence of said ignition circuit, said ignition circuit having a generator, said generator having an armature winding and a magnetic field, said field divided into substantially equal parts, said parts arranged so that substantially one half of the magnetic flux flows through the armature in a direction opposite to that of the other half of the magnetic flux, said armature wound in sections in such manner as to permit induced current to flow through said sections so that lines of force resulting from the flow of current in each section will be opposed by the lines of force resulting from the flow of current in another section, a circuit external to said generator and connected thereto, and an emitter connected to said external circuit, said emitter positioned with respect to said external circuit, so as to oppose the influence of said external circuit upon said receiving circuit.

11. In combination, an ignition circuit, a receiving circuit within the field of influence of said ignition circuit, said ignition circuit having a generator, said generator having an armature winding and a magnetic field, said armature wound in sections in such manner as to permit induced current to flow through said sections, a circuit external to said generator and connected thereto, and an emitter connected to said external circuit, said emitter positioned with respect to said external circuit so as to oppose the influence of said external circuit upon said receiving circuit.

12. In combination, an ignition circuit, a receiving circuit within the field of influence of said ignition circuit, said ignition circuit having a generator, said generator having an armature winding and a magnetic field, said armature wound in sections in such manner as to permit induced current to flow through said sections so that lines of force resulting from the flow of current in each section will be opposed by the lines of force resulting from the flow of current in another section, a circuit external to said generator and connected thereto, and an emitter connected to said external circuit, said emitter positioned with respect to said external circuit so as to oppose the influence of said external circuit upon said receiving circuit.

WILLIAM ARTHUR LOTH.